(12) United States Patent
Kaminsky et al.

(10) Patent No.: US 8,455,608 B2
(45) Date of Patent: Jun. 4, 2013

(54) CATALYZED PELLET HEAT TREATMENT FOR THERMOPLASTIC POLYURETHANES

(75) Inventors: Torben Kaminsky, Lemfoerde (DE); Dirk Kempfert, Stemwede-Dielingen (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/035,232

(22) Filed: Feb. 25, 2011

(65) Prior Publication Data
US 2012/0059141 A1 Mar. 8, 2012

Related U.S. Application Data

(60) Provisional application No. 61/308,320, filed on Feb. 26, 2010.

(51) Int. Cl.
*C08G 18/08* (2006.01)
*C08G 18/16* (2006.01)

(52) U.S. Cl.
USPC .......... 528/48; 528/49; 528/52; 528/53; 528/55; 528/56; 528/58; 528/65; 528/76; 528/80; 528/85; 156/330.9; 156/331.1; 156/331.4; 156/331.7

(58) Field of Classification Search
USPC .......... 528/48, 49, 52, 53, 55, 56, 58, 65, 528/76, 80, 85; 521/137, 155, 156, 157, 158, 521/159, 160, 170, 172, 174; 156/330.9, 156/331.1, 331.4, 331.7
See application file for complete search history.

(56) References Cited

U.S. PATENT DOCUMENTS

| | | | |
|---|---|---|---|
| 4,000,117 A * | 12/1976 | Shah | 528/48 |
| 4,051,886 A * | 10/1977 | Ross | 164/16 |
| 4,659,799 A * | 4/1987 | Nahas et al. | 528/73 |
| 4,737,407 A * | 4/1988 | Wycech | 428/323 |
| 5,032,665 A * | 7/1991 | Bravet et al. | 528/53 |
| 7,012,042 B1 * | 3/2006 | Cataldo et al. | 504/347 |

FOREIGN PATENT DOCUMENTS

| | | |
|---|---|---|
| DE | 2 149 836 | 4/1973 |
| EP | 0 922 552 A1 | 6/1999 |
| EP | 1 031 588 A1 | 8/2000 |
| EP | 1 366 100 B1 | 3/2008 |
| GB | 2136441 A * | 9/1984 |
| GB | 2174620 A * | 11/1986 |
| GB | 2176197 A * | 12/1986 |
| WO | WO 02/44243 A1 | 6/2002 |

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The invention relates to a process for preparing a thermoplastic polyisocyanate polyaddition product based on polyisocyanate (i) and compounds which are reactive toward polyisocyanate, with or without the use of chain extenders, a first catalyst (iv) and/or auxiliaries and/or additives (v), wherein a second catalyst is initially vaporized and then applied to the polyisocyanate polyaddition product by condensation, and to the products prepared therefrom.

30 Claims, 1 Drawing Sheet

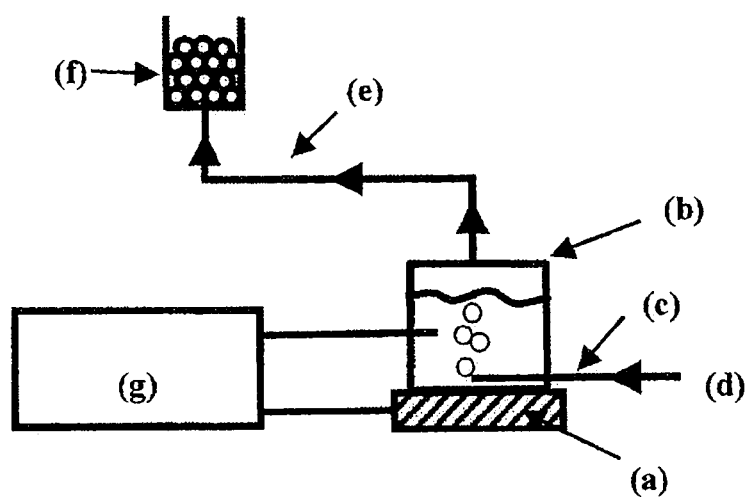

CATALYZED PELLET HEAT TREATMENT FOR THERMOPLASTIC POLYURETHANES

The present invention relates to a process for preparing thermoplastic polyisocyanate polyaddition products.

Thermoplastic polyisocyanate polyaddition products, in particular thermoplastic polyurethane (TPU), have been known for a relatively long time. Owing to their excellent physicomechanical properties and good chemical properties which can be set in a targeted manner within a wide range by appropriate choice of the starting components, their stoichiometric ratios and the preparation conditions, they have increasingly taken their place in the series of high-quality processable plastic elastomers in recent years.

The continuous production processes which dominate industrial production are the belt process or the reaction extruder process in which a pelletized material is usually produced, and this is then generally processed further by the two best-known thermo-plastic processing techniques injection molding or extrusion.

TPU pellets are generally stored for a certain time after the synthesis step in order to conclude the polymerization and to achieve an increase in molecular weight. This process is accelerated by elevated temperature (e.g. from 60° C. to 80° C.), which is also known as heat treatment to those skilled in the art. The heat treatment is frequently carried out in a hopper. Products having particularly high quality requirements, in particular soft TPUs, are usually aged further at ambient temperature after the heat treatment and before further processing. The heat treatment requires a great deal of energy, while storage at ambient temperature requires a large amount of space, is time-consuming and ties up capital.

Particularly in the case of soft TPUs, conglutination of the pellets can easily occur, which then makes further processing considerably more difficult.

DE 2149836 describes, for example, a heat treatment process for preparing polyurethane comprising no free isocyanate groups. Further examples for completing the conversion by heat treatment of the TPUs may be found in EP 1031588 (process 5) and EP 1366100 (Example 1).

DD 300 298 A7 describes a process in which a catalyst is added after extrusion into a water bath. However, only catalysts which are not deactivated by water can be used. DD 300 298 A7 mentions, inter alia, the addition of titanium tetrabutoxide to the process water. However, according to Example 24 in WO 2002 044 243 A1, titanium tetrabutoxide is virtually completely deactivated by hydrolysis within 5 hours on contact with atmospheric moisture and can therefore not be used economically in the process water.

A further disadvantage of this process is that only water-soluble catalysts can be employed in this way. Thus, for example, the catalyst tin dioctoate, which is marketed under the trade name Kosmos 29, is insoluble in water, according to the technical data sheet Polyurethane Additives from Degussa Goldschmidt.

Overall, only a limited proportion of advantageous catalysts can therefore be used for the after-treatment of a polyisocyanate polyaddition product. A further disadvantage of the prior art is that after pelletization a droplet forms on the underside of the pellet and there leads, after evaporation of the water, to a higher concentration of the catalyst and thus to nonuniform after-curing of the pellets.

It is therefore an object of the invention to improve the production of thermoplastic polyisocyanate polyaddition product pellets in such a way that, as a result of catalysis, the heat treatment can be accelerated at a given temperature or be carried out at a lower temperature.

Particularly in the case of soft TPU materials, especially those having a Shore A hardness of less than 80, conglutination of the pellets should be inhibited by accelerated heat treatment at room temperature.

This object has surprisingly been achieved in the preparation of a thermoplastic polyisocyanate polyaddition product based on (i) polyisocyanate and (ii) compounds which are reactive toward polyisocyanate, with or without the use of (iii) chain extenders, a first catalyst (iv) and/or additives (v) which react with one another in a first step, by applying, in a second step, a second catalyst (vi) which accelerates the reaction between the polyisocyanate (i) and the compound (ii) which is reactive toward polyisocyanate, where the second catalyst (vi) is vaporized and/or atomized before application. The second catalyst (vi) is also referred to as polymerization catalyst.

The process of the invention for the first time offers the opportunity of using a significantly broader range of polymerization catalysts for the after-treatment of polyisocyanate polyaddition products and thus for the first time utilize their advantages for the after-treatment of polyisocyanate polyaddition product. Compared to application of the catalyst in solvents, a large amount of energy is saved by, in particular, the embodiments in which only little, if any, solvent and/or plasticizer is used since drying is quicker and solvent removal becomes virtually completely unnecessary, in preferred embodiments completely unnecessary, which is associated with tremendous savings in operating costs.

BRIEF DESCRIPTION OF THE DRAWINGS

FIG. 1 schematically shows a preferred apparatus for a preferred embodiment in which the second catalyst (vi) is heated by means of a hotplate (a) which is connected to a temperature regulating unit (g) in a vessel (b), a carrier gas (d), preferably nitrogen, is introduced into this via a line (c) and the carrier gas/catalyst mixture is applied via a second line (e) to polyisocyanate polyaddition product in a vessel or chamber (f).

For the present purposes, the term polyisocyanate (i) encompasses both a single substance and a mixture of substances, which is/are preferably selected from the following listing: organic isocyanates (a) are aliphatic, cycloaliphatic, araliphatic and/or aromatic isocyanates, more preferably diisocyanates, preferably trimethylene, tetra-methylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatoethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate, preferably diphenyl-methane 2,2'-, 2,4'- and/or 4,4'-diisocyanate (MDI) and/or hexamethylene diisocyanate (HDI). Particular preference is given to a mixture of diphenylethane 4,4'-diisocyanate having a 4,4' isomer content of at least 97%, hexamethylene 1,6-diisocyanate, dicyclohexylmethane diisocyanate and isophorone diisocyanate.

For the purposes of the present invention, a compound (ii) which is reactive toward isocyanate is an essentially linear isocyanate-reactive substance which has on average at least 1.8 and not more than 3.0 Zerevitinov-active hydrogen atoms or a mixture of various substances which meets the stated requirements. Customary isocyanate-reactive groups are, in particular, hydroxyl groups, also amino groups, mercapto groups or carboxyl groups. Preference is given to polyesterols, polyetherols or polycarbonate diols.

These long-chain compounds having Zerevitinov-active hydrogen atoms have a number average molecular weight in the range from 0.45 kg/mol to 5 kg/mol and are used in a molar amount of from 1 to 80 molar equivalent %, based on the isocyanate group content of the polyisocyanate, with the basis for the calculation being the number average molecular weight.

As compounds (ii) which are reactive toward isocyanates, preference is given to using polyhydroxyl compounds, also referred to as polyols, having number average molecular weights of from 0.501 kg/mol to 8 kg/mol, preferably from 0.7 kg/mol to 6 kg/mol, in particular from 0.8 kg/mol to 4 kg/mol, and preferably an average functionality of from 1.8 to 2.6, preferably from 1.9 to 2.2, in particular 2. In a preferred embodiment, only one polyol is used, while in another preferred embodiment mixtures of polyols which, in the mixture, meet the abovementioned requirements are used. The expression "functionality" refers, in particular, to the number of active hydrogen atoms, in particular hydroxyl groups. Preference is given to using polyesterols and/or polyetherols and/or polycarbonate diols, particularly preferably polyester diols, preferably polycaprolactone, and/or polyether polyols, preferably polyether diols, more preferably those based on ethylene oxide, propylene oxide and/or butylene oxide, preferably polypropylene glycol, in particular polyetherols, as polyol. Particular preference is given to using compounds which are suitable for forming a soft phase in the TPU as polyol, preferably copolyesters based on adipic acid and mixtures of 1,2-ethanediol and 1,4-butanediol, copolyesters based on adipic acid and mixtures of 1,4-butanediol and 1,6-hexanediol, polyesters based on adipic acid and 3-methylpentane-1,5-diol and/or polytetramethylene glycol (polytetrahydrofuran, PTHF), particularly preferably copolyesters based on adipic acid and mixtures of 1,2-ethanediol and 1,4-butanediol and/or polytetramethylene glycol (PTHF).

A third starting material for the preparation of polyisocyanate polyaddition products is chain extenders (iii) having on average at least 1.8 and not more than 3.0 Zerevitinov-active hydrogen atoms per molecule, a number average molecular weight of from 0.006 kg/mol to 0.4 kg/mol and a proportion of from 12 to 99 equivalent-%, based on the isocyanate group content of the polyisocyanate. In one embodiment, one chain extender is used, while in another embodiment a mixture of chain extenders which meet the abovementioned requirements is used.

As chain extenders (iii), use is made of generally known aliphatic, araliphatic, aromatic and/or cycloaliphatic compounds having a number average molecular weight of from 0.05 kg/mol to 0.499 kg/mol, very particularly preferably 2-functional compounds, preferably diamines and/or alkanediols having from 2 to 10 carbon atoms in the alkylene radical, more preferably ethanediol, propanediol, 1,4-butanediol, 1,6-hexanediol and 1,4-di(β-hydroxyethyl)hydroquinone, in particular ethanediol, 1,4-butanediol and 1,6-hexanediol.

A further preferred group of chain extenders is composed of aliphatic diamines, in particular ethylenediamine or propylenediamine or mixtures comprising ethylene-diamine and propylenediamine.

In addition, at least one catalyst (iv) and/or customary auxiliaries and/or additives are preferably used.

Preferred catalysts (iv) are organic metal compounds such as titanium compounds, preferably titanic esters, irons compounds, preferably iron acetylacetonate, tin compounds, preferably tin diacetate, tin dioctoate, tin dilaurate, dibutyltin diacetate and dibutyltin dilaurate, with particular preference being given to tin dioctoate.

Other preferred first catalysts (iv) in the preparation of thermoplastic polyisocyanate polyaddition products are amines such as tetramethylethylenediamine, N-methyl-morpholine, diethylbenzylamine, triethylamine, dimethylcyclohexylamine, diazabicyclo-octane, N,N'-dimethylpiperazine, N-methyl-N'-(4-N-dimethylamino)butylpiperazine, N,N,N',N'',N''-pentamethyldiethylenediamine. Further preferred catalysts are amidines, more preferably 2,3-dimethyl-3,4,5,6-tetrahydropyrimidine, tris(dialkylaminoalkyl)-s-hexahydrotriazines, in particular tris(N,N-dimethylaminopropyl)-s-hexahydrotriazine, and also tetraalkylammonium hydroxides, preferably tetramethylammonium hydroxide, alkali metal hydroxides, preferably sodium hydroxide, and alkali metal alkoxides, preferably sodium methoxide and potassium isopropoxide, and also alkali metal salts of long-chain fatty acids having from 10 to 20 carbon atoms and optionally lateral OH groups.

In some preferred embodiments, only one catalyst is used, while in other preferred embodiments a plurality of different catalysts are used side by side; preference is given to using organic metal compounds.

Customary auxiliaries and additives are, for example, plasticizers, lubricants, molecular chain transfer agents, flame retardants, inorganic/organic fillers, dyes, pigments and stabilizers against hydrolysis, light and thermal degradation.

As hydrolysis inhibitors, preference is given to using oligomeric and/or polymeric aliphatic and/or aromatic carbodiimides. To stabilize the TPUs according to the invention against aging, stabilizers can preferably be added to the TPU. For the purposes of the present invention, stabilizers are additives which protect a polymer or a polymer mixture against damaging environmental influences. Examples are primary and secondary antioxidants, hindered amine light stabilizers, UV absorbers, hydrolysis inhibiters, quenchers and flame retardants. Examples of commercial stabilizers are given in Plastics Additive Handbook, 5th Edition, H. Zweifel, ed., Hanser Publishers, Munich, 2001 [1], p. 98-136.

If the TPU according to the invention is subjected to thermoxidative damage during use, antioxidants can be added. Preference is given to using phenolic antioxidants. Examples of phenolic antioxidants are given in Plastics Additive Handbook, 5th edition, H. Zweifel, ed, Hanser Publishers, Munich, 2001, pp. 98-107 and p. 116-121.

The amounts used of the polyisocyanate (i), the compound (ii) which is reactive toward isocyanate and, if present, the chain extender (iii) are preferably matched so that the molar NCO to OH ratio of the polyisocyanate to the sum of the compound (ii) which is reactive toward isocyanate, chain extenders (ii) and, if present, auxiliaries and/or additives is in the range from 0.9:1 to 1.2:1.

The thermoplastic polyisocyanate polyaddition products are preferably prepared by the belt process or the reaction extruder process and processed to give pellets, with the pellets preferably being round, angular or cylindrical.

In the process of the invention for preparing a thermoplastic polyisocyanate polyaddition product, preferably thermoplastic polyurethane (TPU), based on (i) polyisocyanate and compounds (ii) which are reactive toward polyisocyanate, with or without use of chain extenders (iii), a first catalyst (iv)

and/or additives (v), a second catalyst (vi) which accelerates the reaction between the polyisocyanate (i) and the compounds (ii) which are reactive toward polyisocyanate is applied to the polyisocyanate polyaddition product produced, which is preferably present as pellets. This product is preferably present in the form of pellets.

In a preferred process, the second catalyst (vi) applied is at least one amine, preferably triethylamine, dimethylcyclohexylamine, N-methylmorpholine, N,N'-dimethylpiperazine, diazabicyclo[2.2.2]octane.

Other preferred second catalysts (vi) are amines such as tetramethylethylenediamine, N-methylmorpholine, diethylbenzylamine, triethylamine, dimethylcyclohexylamine, diazabicyclooctane, N,N'-dimethylpiperazine, N-methyl-N'-(4-N-dimethylamino)butyl-piperazine, N,N,N',N'',N''-pentamethyldiethylenediamine. Further preferred catalysts are amidines, more preferably 2,3-dimethyl-3,4,5,6-tetrahydropyrimidine, tris(dialkyl-aminoalkyl)-s-hexahydrotriazines, in particular tris(N,N-dimethylaminopropyl)-s-hexahydrotriazine, and also tetraalkylammonium hydroxides, preferably tetramethyl-ammonium hydroxide, alkali metal hydroxides, preferably sodium hydroxide, and alkali metal alkoxides, preferably sodium methoxide and potassium isopropoxide, and also alkali metal salts of long-chain fatty acids having from 10 to 20 carbon atoms and optionally lateral OH groups.

In another preferred embodiment, the second catalyst (vi) comprises at least one organic metal compound, also referred to as organometallic compound.

Preference is given to using an organic metal compound based on titanium, iron and/or tin as second catalyst (vi). The metal compound is particularly preferably a titanic ester and/or tin compound. Preference is given to tin compounds, more preferably tin acetate, tin dioctoate, tin dilaurate or dialkyltin salts of aliphatic carboxylic acids. Particular preference is given to tin dioctoate and dialkyltin salts such as dibutyltin diacetate and/or dibutyltin dilaurate.

In a preferred embodiment, the first catalyst (iv) and the second catalyst (vi), which is preferably applied externally to the pellets, are identical.

The application of the second catalyst (vi) is preferably carried out by processes known to those skilled in the art for application to a surface. Preferred processes are spraying or dipping.

The second catalyst (vi) is preferably applied to the polyisocyanate polyaddition product by spraying. Here, it is possible to use any conventional spraying process.

The spraying units used for a spraying process consist essentially of a spray head, a spray medium line and a spray medium source. The spray head is usually mounted at the front end of a spraying machine arm, with the spray medium line being configured so that it can follow the movements of the spraying machine arm. In other preferred embodiments, the spray head is fixed.

The spray head can also be configured as a spray medium gun and be moved manually, e.g. by a person.

The spray medium source is preferably configured as a spray medium circulation line connected to a spray medium preparation apparatus. In the spray medium preparation apparatus, the spray media, each for a spray medium circulation line, are prepared for the application and maintained in constant application quality and pumped into the spray medium circulation line.

In another preferred embodiment, a solvent and/or plasticizer in which the catalyst (vi) is present in dissolved or suspended form is applied directly to the thermoplastic polyisocyanate polyaddition product, preferably present as pellets. In another embodiment, the solvent and/or plasticizer comprising the catalyst (vi) is fluidized in a gas stream and this gas stream is applied to thermoplastic polyisocyanate polyaddition product, preferably present as pellets.

The spraying process can be carried out continuously or batchwise, with preference being given to the continuous process.

In a preferred process, the catalyst (vi) is applied directly. This is preferably carried out using a carrier gas which applies the finely pulverized catalyst or catalyst which has been atomized into small droplets to the pellet surface. In another preferred process, the catalyst is firstly diluted with a solvent and/or a plasticizer; at least one solvent and/or plasticizer is preferably selected from among acetone, dioctyl adipate, toluene and/or petroleum spirit, with particular preference being given to using acetone.

Another preferred process for applying the catalyst (vi) to the thermoplastic polyisocyanate polyaddition product which is preferably present as pellets comprises dipping the thermoplastic polyisocyanate polyaddition product into a liquid comprising the catalyst (vi).

Depending on the amount of catalyst to be applied, the pellets can be dipped and/or have catalysts sprayed onto them one or more times, with the same catalyst or different catalysts being applied. Excess dipping medium is preferably removed after each dipping operation.

The vessel comprising the catalyst (vi) is, depending on requirements, heated, cooled or maintained at ambient temperature. The application of the catalyst (vi) can be optimized in this way.

In another preferred embodiment, the dipping and spraying processes are combined.

After one of the preferred forms of application of the catalyst, the thermoplastic polyisocyanate polyaddition product is, in a preferred embodiment, dried. This is preferably achieved by means of dryer centrifuges, cold air blowers or hot air blowers. A very particularly preferred form of a catalyst (vi) is a tin compound, in particular tin dioctoate, dissolved in acetone.

The mixture of catalyst (vi) and solvent and/or plasticizer preferably has a viscosity of less than 1 Pas, more preferably less than 0.5 Pas.

In a further preferred embodiment, the catalyst (vi) is converted into a mist in a first step. If the catalyst is a solid, this is achieved by pulverizing the catalyst to a powder, preferably to the size of nanoparticles. Pulverization is carried out by means of any type of comminution apparatuses such as mechanical mills, compressed air mills, ultrasound and the like. The powder produced in this way is fluidized in a first space. If the catalyst is present as liquid or viscous liquid, a mist is produced therefrom by suitable measures. This is effected, in preferred embodiments, by rotary atomization, spraying. In preferred embodiments, the catalyst is partly dissolved by means of a solvent and/or plasticizer before atomization. In a preferred alternative embodiment, the catalyst is vaporized, preferably by introduction of heat. The catalyst vapor and/or catalyst mist is applied to the polyisocyanate polyaddition product, the powder sediments and the vapor condenses.

In a preferred embodiment, the catalyst vapor and/or catalyst mist is produced in a first space and subsequently applied to the polyisocyanate polyaddition product in a second space. The first space is preferably closed but equipped with a suitable device for taking off the catalyst mist and/or vapor. There are preferably connecting pipes between the first space for vapor and/or mist production and the second space for application.

The second space is preferably equipped with a suitable spray device. In a preferred embodiment, the second space is configured so that the catalyst vapor and/or catalyst mist flows from below around the polyisocyanate polyaddition product and leaves the second space in an upward direction, preferably through a flow reduction device. As flow reduction device, it is possible to use any constriction of the air space over the polyisocyanate polyaddition product which leads to a longer residence time of the vapor or mist over the polyisocyanate polyaddition product than in the case of unhindered passage. The flow from below is preferably ensured by the polyisocyanate polyaddition product being arranged as a layer on a screen. The screen can be stationary or, in the case of a continuous process, be in motion. A particularly preferred apparatus for applying the catalyst is a fluidized bed.

In a further preferred embodiment, the catalyst vapor and/or catalyst mist is transferred from the first space into the second space by means of a carrier gas. As carrier gas, it is possible to use any gas which reacts with the catalyst and/or polyisocyanate polyaddition product to only an extent which can be disregarded for the production process, if at all. Preferred carrier gases are air, nitrogen and carbon dioxide, with particular preference being given to nitrogen which, in a preferred embodiment, meets the requirements for an industrial gas. In particular, the dew point of the gas should be below −20° C., preferably below −40° C.

A gauge pressure of from 0.001 bar to 10 bar, preferably from 0.01 bar to 5 bar and particularly preferably from 0.02 bar to 2 bar is preferably generated by means of the carrier gas in the first space in which the catalyst is vaporized and/or atomized and the catalyst vapor and/or catalyst mist is driven over into the second space in this way. This method is particularly well-suited for the continuous process for producing pellets. As an alternative, the carrier gas can also preferably be used for filling a vessel with the catalyst mist and/or catalyst vapor.

In an alternative, preferred embodiment, the catalyst (vi) is vaporized and/or atomized in a closed system and applied, preferably batchwise, to the polyisocyanate polyaddition product. The closed system has the advantage that less catalyst is lost.

To aid vaporization of the catalyst (vi) or make it possible at all, a subatmospheric pressure is preferably generated in a closed system to aid vaporization of the catalyst (vi). The subatmospheric pressure is, in a preferred embodiment, combined with the supply of heat to the catalyst. The heat can be supplied by means of all heating devices. Examples are plate heating, hot air, high-energy radiation such as microwaves or lasers.

The catalyst is vaporized either by means of the subatmospheric pressure alone or by additional heating to from 30° C. to 160° C., preferably to from 50° C. to 150° C., more preferably to from 80° C. to 140° C. In a preferred alternative embodiment, the catalyst is only heated without a subatmospheric pressure being applied at the same time.

Heating of the catalyst (vi) is limited, in particular, by the decomposition temperature thereof. In preferred embodiments, the vaporization temperature is 10° C. below the decomposition temperature, preferably 20° C. below, more preferably 30° C. below and particularly preferably 50° C. below, the decomposition temperature of the catalyst (vi). For the present purposes, the decomposition temperature is the temperature at which the weight loss in a thermogravimetric analysis, also referred to as TGA, at 20° C./min exceeds 10%. Thermogravimetric analysis, also abbreviated to TGF, means analysis in accordance with DIN EN ISO 11358.

In further preferred embodiments, the temperature of the second catalyst (vi) during application is less than 50° C. above the Vicat temperature of the polyisocyanate polyaddition product, preferably less than 20° C. above, more preferably less than 10° C. above, more preferably not above, the Vicat temperature, even more preferably below the Vicat temperature, even more preferably at least 5° C. below the Vicat temperature and particularly preferably at least 10° C. below the Vicat temperature of the polyisocyanate polyaddition product.

For the present purposes, the Vicat temperature is the Vicat softening temperature in accordance with DIN EN ISO 306.

In a further preferred embodiment, the polyisocyanate polyaddition product, preferably present as pellets, is stored at a temperature in the range from 10° C. to 1500, preferably from 50° C. to 120° C., after application of the second catalyst (vi). This operation is also referred to as heat treatment.

In a preferred process, the heat treatment is carried out for from 0 hours to 72 hours, preferably from 1 hour to 24 hours.

The thermoplastic polyisocyanate polyaddition product is preferably a thermoplastic polyurethane. The thermoplastic polyurethane preferably has a hardness in the range from 10 Shore A to 80 Shore D, more preferably from 30 Shore A to 80 Shore D, more preferably from 50 Shore A to 80 Shore D and particularly preferably from 50 Shore A to 70 Shore A.

The invention further provides a polyisocyanate polyaddition product which has been prepared by additional application of a second catalyst according to one of the above-described embodiments, in particular a pelletized material produced in this way.

All preferred embodiments in any conceivable combination are subject matter of the present patent application; in particular, the combinations disclosed in the claims are included.

The following examples illustrate the invention and are not in any way to be interpreted as a restriction.

EXAMPLES

Example 1

In the preparation of thermoplastic polyisocyanate polyaddition products, preferably thermoplastic polyurethane, by the reaction extruder process, the polyol/polyols, the chain extender, the hydrolysis stabilizer, the catalyst and further raw materials which do not comprise isocyanate are premixed at 150° C. and fed into the first barrel of a twin-screw extruder. The polyisocyanate is separately fed at a reservoir temperature of 65° C. into the first barrel. The speed of rotation of the twin screws was 280 $min^{-1}$. The temperature settings of the barrels were, in the flow direction, 200° C. in the first third of the screw, 170° C. in the second third of the screw and 190° C. in the third and last third of the screw. The output was 850 kg/h. After chopping of the melt by underwater pelletization and integrated centrifugral drying, the pellets were finally dried at about 80° C.-90° C.

In the preparation of polyurethane according to EP 0 922 552, the polyol/polyols, the chain extender, the hydrolysis stabilizer, the catalyst and further raw materials which do not comprise isocyanate and also polyisocyanate are heated to 80° C. and intensively mixed in a mixing head. The reaction mixture obtained was applied at a temperature of 97° C. to a PTFE belt and conveyed through a tunnel kiln. The reaction mixture which has solidified at the end of the belt to form a strip material is continuously fed by means of intake rollers to a comminution and homogenization apparatus. There, it is comminuted and fed into a tangentially flanged-on single-screw extruder. The barrel temperatures are 160° C. in the feed section, 180° C. in the middle zone and 220° C. in the discharge zone. After chopping of the melt by underwater pelletization and integrated centrifugal drying, the pellets were finally dried at about 80° C.-90° C.

Example 1a)

Ether TPU Shore Hardness 85 A 1000 parts by weight of polytetrahydrofuran
600 parts by weight of diphenylmethane 4,4'-diisocyanate
126 parts by weight of 1,4-butanediol Produced using a plant for the continuous preparation of thermoplastic polyurethane elastomers described, for example, in EP 0 922 552.

Example 1b)

Ether TPU Shore Hardness 85 A 1000 parts by weight of polytetrahydrofuran
600 parts by weight of diphenylmethane 4,4'-diisocyanate
126 parts by weight of 1,4-butanediol Produced by the reaction extruder process described, for example, in Reactive Extrusion, M. Xanthos, Carl Hanser Verlag, Munich 1992.

Example 1c)

Ether TPU Shore Hardness 90 A 1000 parts by weight of polytetrahydrofuran
700 parts by weight of diphenylmethane 4,4'-diisocyanate
162 parts by weight of 1,4-butanediol Produced by the reaction extruder process described, for example, in Reactive Extrusion, M. Xanthos, Carl Hanser Verlag, Munich 1992

Example 2

In Example 2, pellets from Example 1 were sprayed with the catalyst tin dioctoate (SDO) dissolved in acetone. Owing to the viscosity of the SDO, the catalyst had been diluted with acetone to such an extent that it could be sprayed. Table 1 shows the experimental results.

The content of free NCO groups and NCO groups bound via allophanate and/or biurret bonds before spraying was 0.16% by weight. A description of the determination of this residual NCO content may be found, for example, in Plaste and Kautschuk, number 7/1980, page 374.

TABLE 1

Experiments on catalyzed heat treatment, spraying using solvent

| Treatment with the catalyst | Storage | Residual NCO [%] after storage | Solution viscosity with 20% of dimethylformamide and 1% of N-butylamine at 23° C. [mPas] |
| --- | --- | --- | --- |
| None | 2 h at 80° C. and 2 days storage at room temperature | 0.075 | 85 |
| 10% of SDO in acetone/pellets sprayed; addition of about 300 ppm of tin*) | 2 h at 80° C. and 2 days storage at room temperature | 0.064 | 95 |
| 10% of SDO in acetone/pellets dipped for 1 s; addition of about 800 ppm of tin*) | 2 days storage at room temperature | 0.039 | 115 |

*)The concentration reported for tin is of Zn(II) and is based on the total weight of the polyurethane used.

It has surprisingly been found that the reaction can be accelerated by application of catalyst to solid pellets even at low residual NCO concentrations. It is therefore surprising that, according to the literature, e.g. Plaste and Kautschuk, number 3/1987, page 116, Kinetische Untersuchungen zur Bildung von linearen PUR-Elastomeren, the catalyzed reaction is not effective for degrees of conversion of greater than 90%. In the above example, a higher degree of maturation than in the case of uncatalyzed heat treatment alone has been achieved even by simple application of the catalyst without heat treatment, which could not have been deduced from the underlying reaction theory.

Example 3

Vapor Treatment Experiments

A stream of nitrogen saturated with tin dioctoate at 120-125° C. was passed through a bed of pellets (see also FIG. 1).

The heating temperature, the volume flow of nitrogen and the vapor treatment time were varied in the experiments. In addition to the treatment indicated in Table 2, the samples were each stored at room temperature for 15 hours before analysis.

TABLE 2

Experiments on catalyzed heat treatment, vapor treatment

| Product | Treatment with catalyst | | | Heat treatment | Residual NCO [%] after storage | Solution viscosity with 20% of dimethylformamide and 1% of N-dibutylamine at 23° C. [mPas] |
| --- | --- | --- | --- | --- | --- | --- |
| | Vapor treatment time | SDO temp. | $N_2$ flow | | | |
| As per Example 1b) | — | — | — | — | 0.115 | 113 |
| As per Example 1b) | 2 min | 120° C. | 0.3 m³/h | — | 0.102 | 117 |
| As per Example 1b) | 4 min | 120° C. | 0.3 m³/h | — | 0.100 | 124 |
| As per Example 1c) | — | — | — | — | 0.131 | 88 |

TABLE 2-continued

Experiments on catalyzed heat treatment, vapor treatment

| Product | Treatment with catalyst | | | Heat treatment | Residual NCO [%] after storage | Solution viscosity with 20% of dimethylformamide and 1% of N-dibutylamine at 23° C. [mPas] |
| --- | --- | --- | --- | --- | --- | --- |
| | Vapor treatment time | SDO temp. | N₂ flow | | | |
| As per Example 1c) | — | — | — | 3 h 80° C. | 0.102 | 129 |
| As per Example 1c) | 4 min | 120° C. | 0.3 m³/h | 3 h 80° C. | 0.083 | 157 |
| As per Example 1a) | — | — | — | 3 h 80° C. | 0.062 | 112 |
| As per Example 1a) | 10 min | 125° C. | 0.9 m³/h | 3 h 80° C. | 0.042 | 126 |

It can be seen from Table 2 that a residual NCO content which was up to 0.02 percentage points lower after heat treatment was also achieved in these experiments using the vapor treatment method.

Furthermore, it was confirmed that the additional catalysis does not lead to a reduction in the extrusion quality.

The invention claimed is:

1. A process for preparing a thermoplastic polyisocyanate polyaddition product based on polyisocyanate (i) and compounds (II) which are reactive toward polyisocyanate, with or without the use of chain extender (iii), a first catalyst (iv) and/or auxiliaries and/or additives (v), which react with one another in a first step, wherein, in a second step, a second catalyst (vi) which accelerates the reaction between the polyisocyanate (i) and the compounds (ii) which are reactive toward polyisocyanate is applied to the polyisocyanate polyaddition product prepared in this way, where the second catalyst (vi) is initially converted into a mist and/or vaporized and is then applied to the polyisocyanate polyaddition product wherein the polyisocyanate polyaddition product is present as pellets.

2. The process according to claim 1, wherein the thermoplastic polyisocyanate polyaddition product is thermoplastic polyurethane.

3. The process according to claim 1, wherein said second catalyst (vi) is vaporized and/or atomized to form a catalyst mist in a first space and is subsequently applied to the polyisocyanate polyaddition product in a second space.

4. The process according to claim 3, wherein the catalyst vapor and/or catalyst mist is transferred from the first space into the second space by means of a carrier gas.

5. The process according to claim 4, wherein the carrier gas generates a superatmospheric pressure of from 0.001 bar to 10 bar in the first space and the catalyst vapor and/or catalyst mist is in this way driven over into the second space.

6. The process according to claim 1, wherein said second catalyst (vi) is vaporized and/or atomized in a closed system and is thereby applied to the polyisocyanate polyaddition product.

7. The process according to claim 6, wherein a subatmospheric pressure at which said second catalyst (vi) vaporizes prevails in the system.

8. The process according to claim 1, wherein said second catalyst (vi) is heated to not more than 10° C. below its decomposition temperature during vaporization.

9. The process according to claim 1, wherein the temperature during vaporization of the catalyst is in the range from 30° C. to 160° C.

10. The process according to claim 1, wherein the temperature of the second catalyst (vi) during application is less than 50° C. above the Vicat temperature of the polyisocyanate polyaddition product.

11. The process according to claim 1, wherein the polyisocyanate polyaddition product is heat-treated at a temperature in the range from 10 to 150° C. after application of the second catalyst.

12. The process according to claim 1, wherein said second catalyst (vi), comprises at least one tertiary amine.

13. The process according to claim 1, wherein said second catalyst (vi), comprises at least one metal salt of an organic acid or an organometallic compound.

14. The process according to claim 2, wherein said thermoplastic polyurethane has a Shore A hardness in the range from 10 to 80.

15. The process according to claim 2, wherein said thermoplastic polyurethane has a Shore A hardness in the range from 10 to 60.

16. The process according to claim 2, wherein said thermoplastic polyurethane has a Shore A hardness in the range from 10 to 40.

17. The process according to claim 2, wherein said thermoplastic polyurethane has a Shore A hardness in the range from 10 to 30.

18. The process according to claim 4, wherein the carrier gas generates a superatmospheric pressure of from 0.01 bar to 5 bar in the first space and the catalyst vapor and/or catalyst mist is in this way driven over into the second space.

19. The process according to claim 4, wherein the carrier gas generates a superatmospheric pressure of from 0.02 bar to 2 bar in the first space and the catalyst vapor and/or catalyst mist is in this way driven over into the second space.

20. The process according to claim 1, wherein said second catalyst (vi) is heated to not more than 20° C. below its decomposition temperature during vaporization.

21. The process according to claim 1, wherein said second catalyst (vi) is heated to not more than 30° C. below its decomposition temperature during vaporization.

22. The process according to claim 1, wherein said second catalyst (vi) is heated to not more than 50° C. below its decomposition temperature during vaporization.

23. The process according to claim 1, wherein the temperature during vaporization of the catalyst is in the range from 50° C. to 150° C.

24. The process according to claim 1, wherein the temperature during vaporization of the catalyst is in the range from 80° C. to 140° C.

25. The process according to claim 1, wherein the temperature of the second catalyst (vi) during application is less than 20° C. above the Vicat temperature of the polyisocyanate polyaddition product.

26. The process according to claim 1, wherein the temperature of the second catalyst (vi) during application is less than 10° C. above the Vicat temperature of the polyisocyanate polyaddition product.

27. The process according to claim 1, wherein the temperature of the second catalyst (vi) during application is below the Vicat temperature of the polyisocyanate polyaddition product.

28. The process according to claim 1, wherein the temperature of the second catalyst (vi) during application is at least 5° C. below the Vicat temperature of the polyisocyanate polyaddition product.

29. The process according to claim 1, wherein the temperature of the second catalyst (vi) during application is at least 10° C. below the Vicat temperature of the polyisocyanate polyaddition product.

30. The process according to claim 1, wherein the polyisocyanate polyaddition product is heat-treated at a temperature in the range from 50 to 120° C., after application of the second catalyst.

* * * * *